C. B. WANAMAKER.
ROLLER CORD HOOK.
APPLICATION FILED OCT. 29, 1917.
1,292,545.
Patented Jan. 28, 1919.
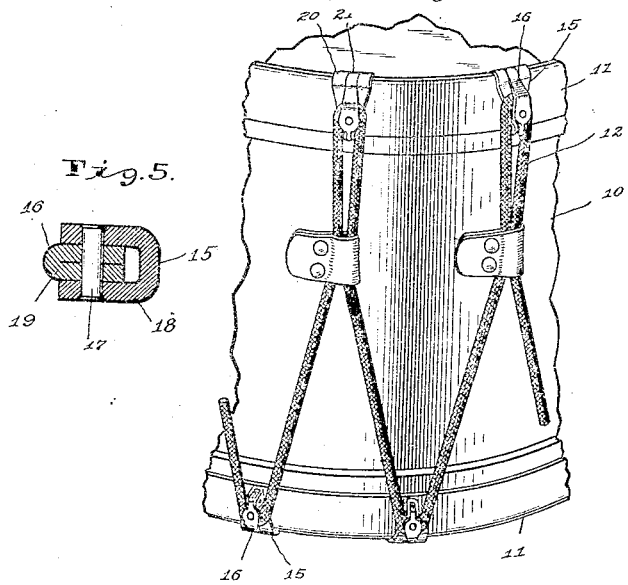
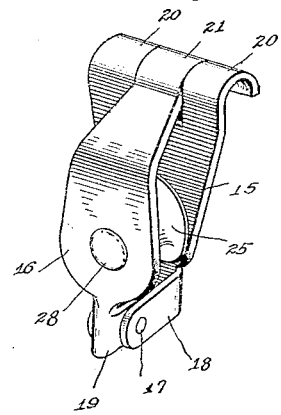
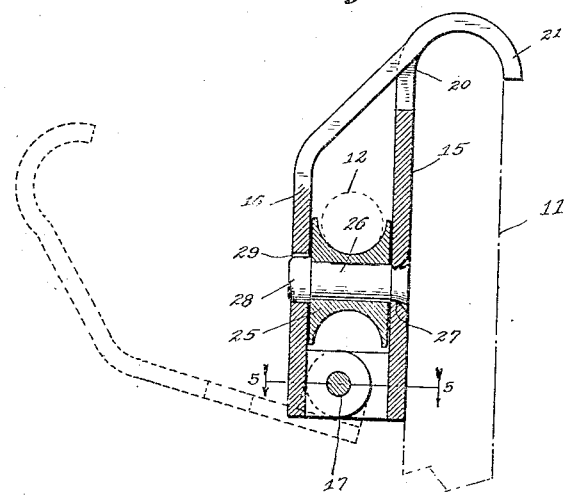
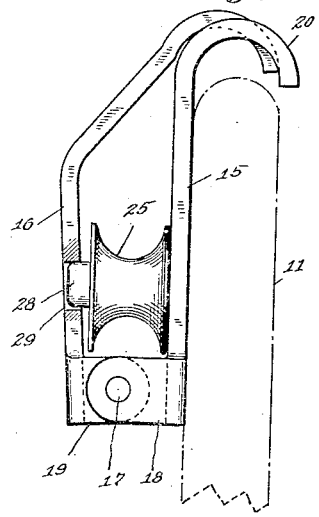
Witness
Frank A. Fahle
Inventor
Charles B. Wanamaker
By
Hood & Ashley
Attorneys

UNITED STATES PATENT OFFICE.

CHARLES B. WANAMAKER, OF INDIANAPOLIS, INDIANA, ASSIGNOR TO LEEDY MANUFACTURING COMPANY, OF INDIANAPOLIS, INDIANA, A CORPORATION OF INDIANA.

ROLLER-CORD HOOK.

1,292,545.  Specification of Letters Patent.  Patented Jan. 28, 1919.

Application filed October 29, 1917. Serial No. 199,085.

*To all whom it may concern:*

Be it known that I, CHARLES B. WANAMAKER, a citizen of the United States, residing at Indianapolis, in the county of Marion and State of Indiana, have invented a new and useful Roller-Cord Hook, of which the following is a specification.

It is the object of my invention to provide a roller cord hook for drums, which will permit the cord to be put in place on the roller without the necessity for threading it through an eye, but which when in use incloses the cord in an eye so that it cannot be displaced accidentally; and to do this in an inexpensive construction.

The accompanying drawing illustrates my invention. Figure 1 is a fragmentary perspective view of a drum equipped with roller cord hooks embodying my invention; Fig. 2 is an enlarged perspective view of my roller cord hook; Fig. 3 is a longitudinal section, substantially central, through my cord hook, showing the swinging hook in full lines in working position and in dotted lines in the position to permit the cord to be put on and taken off; Fig. 4 is a view similar to Fig. 3, but with the swinging hook swung slightly toward open position, to show the spring latch action thereon of the roller pivot pin; and Fig. 5 is a section on the line 5—5 of Fig. 3.

My roller cord hook is applied to the drum 10, of any usual form, by being hooked over the edges of the drum hoop 11 in the usual manner, and being held in place by the coöperating drum cord 12.

My roller cord hook has two main members 15 and 16, which are conveniently made of stampings. These two main members are hinged together at their bases, by a pivot pin 17 passing through upturned ears 18 and 19 on such members. The main member 15 lies along the face of the drum hoop 11, and at its end opposite the ears 18 is provided with two curved fingers 20, which hook over the edge of the drum hoop 11 and are spaced apart. The main member 16 is spaced from the main member 15 for some distance from the ears 18 and 19, and then slants obliquely toward the main member 15; and the free end of this slanting portion is provided with a curved finger or hook 21 which projects into the space between the two fingers 20 and like such fingers 20 hooks over the edge of the drum hoop 11. Thus when the fingers 20 and 21 are in place on the drum hoop 11, the main member 16 cannot be swung about its hinge axis, because of the interlocking of the fingers 21 with the edge of the drum hoop 11.

Between the two main members 15 and 16 a roller 25 is mounted on a pivot pin 26. This pivot pin 26 is riveted in place in a hole 27 in the main member 15, as is clear from Fig. 3, but this riveting is preferably slightly loose so that a slight tilting of the pivot pin is possible. The pivot pin 26 has an enlarged head 28 which holds the roller 25 in place thereon. This head 28 is received in a hole 29 in the main member 16 when the latter is swung into working position, shown in full lines in Fig. 3. At this time, that side of the hole 29 which is nearest the hinge 17 is swung up into engagement with the corresponding part of the head 28, as is shown in Fig. 3, so as to form a support therefor, so that the pin 26 is supported at both ends against the pull of the drum cord 12 on the roller 25. When the main member 16 is swung open, the other side of the hole 29 preferably drags slightly on the other side of the head 28, as is illustrated in Fig. 4, so as to provide a spring catch and prevent the main member 16 from swinging open accidentally, even if the hook is separated from the drum hoop 11. The loose riveting of the pin 26 in the hole 27 permits a slight yielding of the pin 26 to produce these results, even in case of slight inaccuracies. The finger 21 may drag between the fingers 20 to produce a similar spring catch action, if desired.

In operation, with the main member 16 swung into the dotted line position shown in Fig. 3, the drum cord 12 is put in place on the roller 25, and then the main member 16 is swung to the position shown in full lines in Fig. 3. The hook may be left substantially in this condition, or in the condition shown in Fig. 4, while the cord is being put on the rollers 25 of the other hooks; and will not drop off because the cord is inclosed in the eye formed by the roller 25 and the two main members 15 and 16. The drag of the side of the hole 29 on the head 28 or of the finger 21 on the fingers 20 effectively prevents the main member 16 from swinging to open position at this time. When the cord 12 has been put on all the hooks and the hooks have been properly placed over the edges of the hoops 11, the cord 12 is tightened in the usual manner. The curved fingers 20 and 21 interlock with the edges of the hoops 11 and hold the device in place. The cord cannot be removed from the roller 25, either by accident or design, without first lifting the hook from the edge of the hoop 11, and even then it can only be removed by design because of the spring lock formed by the head 28 and hole 29.

I claim as my invention:

1. A roller cord hook, comprising two main members hinged together and both provided with curved fingers for coöperating with a drum hoop, and a roller mounted in the space between said two main members so that when the two main members are swung open a drum cord may be put in place or removed laterally from the roller and when the two main members are swung together the cord on the roller is inclosed in an eye formed by the roller and the two main members, said curved fingers being offset from the plane of the roller and registering when the two members are swung together so as to coöperate similarly with the edge of the drum hoop.

2. A roller cord hook, comprising two main members hinged together at one end and provided at the other end with curved fingers which hook over the edge of a drum hoop, a curved finger on one of said members being located in a space between two curved fingers on the other member, a bearing pin mounted in one of said main members, and a roller mounted on said pin, said roller being located between said hinge and said curved fingers so that when the two main members are swung together it is inclosed between them, and said curved fingers on the two members being offset from the plane of the roller and registering when the two main members are swung together so as to coöperate similarly with the edge of the drum hoop.

3. A roller cord hook, comprising two main members hinged together at one end and provided at the other end with curved fingers which hook over the edge of a drum hoop, a bearing pin mounted in one of said main members, and a roller mounted on said pin, said roller being located between said hinge and said curved fingers so that when the two main members are swung together it is inclosed between them, said curved fingers on the two members being offset from the plane of the roller and registering when the two main members are swung together so as to coöperate similarly with the edge of the drum hoop, said bearing pin being provided with a head and the other main member with a hole for receiving said head when the two main members are swung together, and said pin and said hole being so relatively arranged that the pin drags on the wall of the hole as the two members are moved relatively so as to form a catch for preventing them from swinging apart accidentally.

4. A roller cord hook, comprising two main members hinged together at one end and provided at the other end with curved fingers which hook over the edge of a drum hoop, a bearing pin mounted in one of said main members, and a roller mounted on said pin, said roller being located between said hinge and said curved fingers so that when the two main members are swung together it is inclosed between them, said curved fingers on the two members being offset from the plane of the roller and registering when the two main members are swung together so as to coöperate similarly with the edge of the drum hoop, said bearing pin being provided with a head and the other main member with a hole for receiving said head when the two main members are swung together, and said pin and said hole being so relatively arranged that the pin drags on the wall of the hole as the two members are moved relatively so as to form a catch for preventing them from swinging apart accidentally, said bearing pin being mounted in the first main member by a loose mounting so as to permit a slight tilting thereof.

5. A roller cord hook, comprising two main members hinged together at one end and provided at the other end with curved fingers which hook over the edge of a drum hoop, a curved finger on one of said members being located in a space between two curved fingers on the other member, and a roller which with said main members forms a closed eye when the two main members are swung together and is rendered accessible to receive a drum cord laterally when the two main members are swung apart, and said curved fingers on the two members being offset from the plane of the roller and registering when the two main members are swung together so as to coöperate similarly with the edge of the drum hoop.

6. A roller cord hook, comprising two main members hinged together at one end and provided at the other end with curved fingers which hook over the edge of a drum hoop, a bearing pin mounted in one of said main members, and a roller mounted on said pin, said roller being located between said hinge and said curved fingers so that when the two main members are swung together it is inclosed between them, and said curved fingers being arranged to drag on each other as they are moved relatively.

7. A roller cord hook, comprising two main members hinged together at one end, a roller mounted on one of said main members in the space between said two main members so that when the two main members are swung open a drum cord may be put in place or removed laterally from the roller and when the two main members are swung together the cord on the roller is inclosed in an eye formed by the roller and the two main members, one of said members being arranged to lie against the side of the drum hoop and the other projecting past the roller and said first main member and being provided with a curved finger offset from the plane of the roller and the main members so that it may coöperate with the edge of the drum hoop when the first main member lies against the side of the drum hoop.

In witness whereof, I have hereunto set my hand at Indianapolis, Indiana, this 25th day of October, A. D. one thousand nine hundred and seventeen.

CHARLES B. WANAMAKER.